US011311359B1

(12) United States Patent
Alhumayyani

(10) Patent No.: US 11,311,359 B1
(45) Date of Patent: *Apr. 26, 2022

(54) COSMETIC DENTAL SYSTEM WITH MAGNETIC ATTACHMENT

(71) Applicant: King Abdulaziz University, Jeddah (SA)

(72) Inventor: Fadia Mohammed Alhumayyani, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,953

(22) Filed: Mar. 19, 2021

Related U.S. Application Data

(63) Continuation of application No. 17/172,570, filed on Feb. 10, 2021.

(51) Int. Cl.
*A61C 13/235* (2006.01)
*A61C 13/00* (2006.01)
*A61C 5/20* (2017.01)

(52) U.S. Cl.
CPC .............. *A61C 13/235* (2013.01); *A61C 5/20* (2017.02); *A61C 13/0006* (2013.01)

(58) Field of Classification Search
CPC .. A61C 5/007; A61C 5/20; A61C 5/30; A61C 13/235; A61C 8/0081; A61C 7/006; A61C 7/08; A61C 13/0001
See application file for complete search history.

(56) References Cited

U.S. PATENT DOCUMENTS

| 3,760,502 | A | * | 9/1973 | Hirsch | A61C 5/20 433/222.1 |
| 4,158,256 | A | * | 6/1979 | Wiland | A61C 13/235 433/219 |
| 5,951,291 | A | * | 9/1999 | Albert | A61C 5/20 433/215 |
| 8,043,092 | B2 | * | 10/2011 | Stonisch | A61C 19/10 433/196 |

(Continued)

FOREIGN PATENT DOCUMENTS

| AU | 2014245793 B2 | 6/2019 |
| FR | 2393565 | * 1/1979 |

OTHER PUBLICATIONS

Machine Translation of FR2393565. Accessed via EPO website on May 17, 2021 (Year: 1979).*

*Primary Examiner* — Edward Moran
(74) *Attorney, Agent, or Firm* — Oblon, McClelland, Maier & Neustadt, L.L.P.

(57) ABSTRACT

A removable cosmetic dental structure and a method of fabricating the removable cosmetic dental structure is provided. The removable cosmetic dental structure includes a removable veneer body, having a front side and a rear side, sized to cover at least a portion of a facial surface of a tooth structure. The front side of the removable veneer body is shaped to resemble a tooth surface and the rear side of the removable veneer body covers the facial surface of the tooth structure. The removable cosmetic dental structure further includes one or more magnetic layers integrated on the rear side of the removable veneer body. The magnetic layers are configured to hold the removable veneer body to the facial surface of the tooth structure.

9 Claims, 6 Drawing Sheets

(56) References Cited

U.S. PATENT DOCUMENTS

| | | | |
|---|---|---|---|
| 8,376,745 B2* | 2/2013 | Stonisch | A61C 13/0001 433/215 |
| 8,926,327 B2* | 1/2015 | Massad | A61C 13/0001 433/213 |
| 2003/0224313 A1 | 12/2003 | Bergersen | |
| 2008/0044793 A1* | 2/2008 | White | A63J 7/00 433/171 |
| 2009/0004629 A1* | 1/2009 | Fishman | A61C 13/26 433/217.1 |
| 2020/0222158 A1* | 7/2020 | Coreil | A61C 13/2656 |

* cited by examiner

COSMETIC DENTAL SYSTEM WITH MAGNETIC ATTACHMENT

CROSS-REFERENCE TO RELATED APPLICATIONS

The present application is a continuation of Ser. No. 17/172,570, pending, having a filing date of Feb. 10, 2021.

BACKGROUND

Field of the Invention

The present disclosure relates to a dental device and, more particularly relates, to a removable cosmetic dental structure and a method for fabricating the removable cosmetic dental structure.

DISCUSSION OF THE RELATED ART

Dental removable veneer is used for temporary attachment to either upper dentition or lower dentition or both, such that a portion or a whole of the dentition is covered from outside. The dental removable veneer is placed over the dentition in order to mimic the underlying teeth in a desired size, shape, or profile so that the new appearance of the teeth looks more fit and appropriate. Dental removable veneers are available in the form of a solid appliance and attached over the teeth to cover the undesired teeth or the whole dentition. The known dental removable veneer may be attached over the dentition with a gripping mechanism and can be removed by pulling the veneer off the tooth structure. However, the existing dental removable veneers have certain disadvantages which causes undesired experience to the user.

For example, a known dental removable veneer includes three sides for covering the tooth structure of the user. The three sides include a front side covering a facial surface of the tooth structure, a rear side covering a lingual surface of the tooth structure, and a bottom side covering an occlusal surface of the tooth structure. During use, the dental removable veneer may provide an artificial tooth structure having a desired shape and appropriate fitting to the original tooth structure along the three sides thereof. However, the dental removable veneer causes discomfort to the user while pronouncing or communicating with other person or while biting or eating food. Further, the dental removable veneer may tend to easily break due to excess pressure applied while chewing food. Moreover, the dental removable veneer may have a loose fit as it is attached with the tooth structure by snap fit and the dental removable veneer may be pulled away from the tooth surface which may cause pain to the user. Hence, there remains a need to develop a dental removable veneer which eliminates the above-mentioned uncomfortable experience to the user while providing the desired appearance to the removable tooth structure of the user.

SUMMARY

In one aspect of the present disclosure, a cosmetic dental structure is disclosed. The cosmetic dental structure includes a removable veneer body sized to cover at least a portion of a facial surface of a tooth structure. The removable veneer body has a front side and a rear side. At least a portion of the front side of the removable veneer body is shaped to resemble a tooth surface. The rear side of the removable veneer body covers at least a portion of the facial surface of a plurality of tooth structures. The cosmetic dental structure further includes one or more magnetic layers, which include a first magnetic layer and a second magnetic layer, integrated on the rear side of the removable veneer body. In an embodiment, the removable veneer body has a first end and a second end, and the first magnetic layer is integrated on the rear side of the first end and the second magnetic layer is integrated on the rear side of the second end. The rear side of the first end of the removable veneer body faces the facial surface of a first posterior tooth at a first end of the tooth structure. Also, the rear side of the second end of the removable veneer body faces the facial surface of a second posterior tooth at a second end of the tooth structure. The first magnetic layer integrated on the rear side of the first end of the removable veneer body is configured to magnetically attract to a third magnetic layer placed on the facial surface of the first posterior tooth at the first end of the tooth structure. Similarly, the second magnetic layer integrated on the rear side of the second end of the removable veneer body is configured to magnetically attract to a fourth magnetic layer placed on the facial surface of the second posterior tooth at the second end of the tooth structure. The first magnetic layer and the third magnetic layer have opposite polarity and the second magnetic layer and the fourth magnetic layer have opposite polarity, therefore the one or more magnetic layers are configured to hold the removable veneer body to the facial surface of the tooth structure.

In an embodiment, the cosmetic dental structure is comprised of a material selected from high performance resin, thermoplastic resin, porcelain, composite material, polyacetal polymer, or copolymer that is preferably crystalline. The magnetic layer is at least one of a magnetic plate, a magnetic mesh, or a combination of the magnetic plate and the magnetic mesh. In another embodiment, the first and the second magnetic layers are positioned towards a middle portion of the rear side of the first end and the second end of the removable veneer body, respectively.

In another aspect of the present disclosure, a method of fabricating a cosmetic dental structure is disclosed. The method includes forming a removable veneer body sized to cover at least a portion of a facial surface of a tooth structure. The removable veneer body has a front side and a rear side. The method further includes integrating one or more magnetic layers on the rear side of the removable veneer body. The one or more magnetic layers, which include a first magnetic layer and a second magnetic layer, are configured to hold the removable veneer body to the facial surface of the tooth structure. At least a portion of the front side of the removable veneer body is shaped to resemble a tooth surface and the rear side of the removable veneer body covers at least a portion of the facial surface of a plurality of tooth structures. The removable veneer body includes a first end and a second end, and the first magnetic layer is integrated on the rear side of the first end, and the second magnetic layer is integrated on the rear side of the second end.

In an embodiment, the cosmetic dental structure is comprised of a material selected from high performance resin, thermoplastic resin, porcelain, composite material, polyacetal polymer, or copolymer that is preferably crystalline. The magnetic layer is at least one of a magnetic plate, a magnetic mesh, or a combination of the magnetic plate and the magnetic mesh. Further, the first magnetic layer is positioned towards a middle portion of the rear side of the first end of the removable veneer body.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
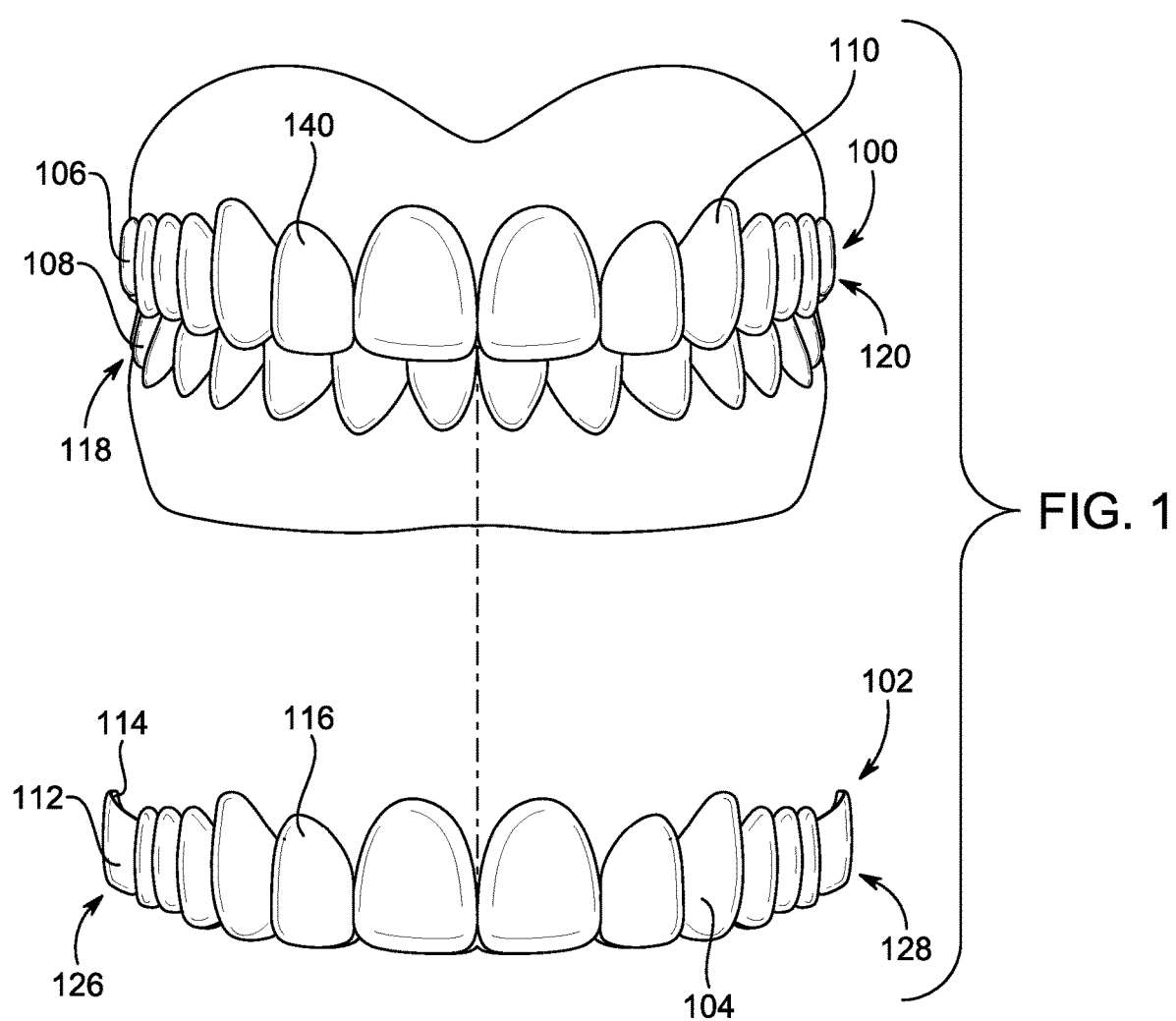
FIG. 1 is a schematic front perspective view of a tooth structure and front perspective view of a removable cosmetic dental structure for an upper jaw shown detached from the tooth structure, according to an embodiment of the present disclosure.

Referring to FIG. 1, a schematic perspective view of a tooth structure 100 and a removable cosmetic dental structure 102 having a removable veneer body 104 is illustrated, according to an embodiment of the present disclosure. The tooth structure 100 includes an upper dentition 106 and a lower dentition 108. The present disclosure relates to an upper removable cosmetic dental structure, hereinafter referred to as 'the removable cosmetic dental structure 102', configured to attach with the upper dentition 106 and a lower removable cosmetic dental structure (not shown) configured to attach with the lower dentition 108. For the sake of brevity and clarity in the description, the removable cosmetic dental structure 102 is illustrated in detail herein below. As shown in FIG. 1, the removable cosmetic dental structure 102 is shown detached from the upper dentition 106 of the tooth structure 100. For the mere purpose of illustration, the tooth structure 100 hereinafter refers to 'the upper dentition 106' of a user.

The removable veneer body 104 of the removable cosmetic dental structure 102 is sized to cover at least a portion of a facial surface 110 of the tooth structure 100. In an embodiment, the removable veneer body 104 may be molded in a way to cover the facial surface 110 defined by the entire teeth including the third molar tooth of the tooth structure 100. Alternatively, the removable veneer body 104 may cover the portion of the facial surface 110 defined between the incisor teeth and the premolar teeth of the tooth structure 100. The removable veneer body 104 has a front side 112 and a rear side 114 opposite to the front side 112. The front side 112 of the removable veneer body 104 is shaped in such a way that at least a portion of the front side 112 of the removable veneer body 104 resembles to the facial surface 110. Particularly, a tooth surface 116 of the removable cosmetic dental structure 102 may resemble to a tooth surface 140 of the facial surface 110 of the tooth structure 100. In an embodiment, each tooth surface of the removable cosmetic dental structure 102 may resemble a corresponding tooth in the tooth structure 100. Each tooth surface of the removable cosmetic dental structure 102 may have a color (e.g. white color) that is different from a color of the corresponding tooth (e.g. gray color) in the tooth structure 100. In other words, the front side 112 of the removable veneer body 104 may be designed to appear aesthetic when the removable cosmetic dental structure 102 is attached to the tooth structure 100. The rear side 114 of the removable veneer body 104 covers at least the portion of the facial surface 110 of a plurality of tooth structures. The plurality of tooth structures is alternatively referred to as 'the tooth structure 100'. The tooth structure 100 further includes a first end 118 and a second end 120. The first end 118 of the tooth structure 100 may be defined by a first posterior tooth 122 (shown in FIG. 3A) at the right side of the tooth structure 100. Similarly, the second end 120 of the tooth structure 100 may be defined by a second posterior tooth 124 (shown in FIG. 3A) at the left side of the tooth structure 100. The first posterior tooth 122 may be further defined as the third molar tooth at the right side of the tooth structure 100 and the second posterior tooth 124 may be defined as the third molar tooth at the left side of the tooth structure 100. Shape, size, constructional features, or dimensional specification of the removable veneer body 104 may be defined based on a shape and a size of the tooth structure 100, such that upon wearing the removable cosmetic dental structure 102, the removable veneer body 104 fits over the facial surface 110 of the tooth structure 100 and covers at least the portion of the facial surface 110 of the tooth structure 100.

In an embodiment, the removable cosmetic dental structure 102 may be manufactured using a material selected from high performance resin, thermoplastic resin, porcelain, composite material, polyacetal polymer, or copolymer that is preferably crystalline or any other known non-toxic material. Using such material, the removable cosmetic dental structure 102 may be manufactured using a 3D printing method known in the art. For example, a layout of the removable cosmetic dental structure 102 for the user may be obtained either through scanning the tooth structure 100 or using a wax bite or a rubber bite. Upon obtaining details regarding the dimension of the removable cosmetic dental structure 102 corresponding to the tooth structure 100 of the user, the details may be fed to an electronic system associated with the 3D printing mechanism or other high precision machineries known in the art to 3D print the removable cosmetic dental structure 102.

In an embodiment, the removable cosmetic dental structure 102 may be manufactured using a polyacetal polymer or copolymer that is preferably crystalline. The removable cosmetic dental structure 102 manufactured from the polyacetal polymer or copolymer that is preferably crystalline provides a durable and a stain resistant removable cosmetic dental structure 102. Further, the removable cosmetic dental structure 102 manufactured from a polyacetal polymer or copolymer that is preferably crystalline preferably has a thickness of 0.5 millimeter (mm) without compromising a tensile strength of the removable cosmetic dental structure 102.

The polyacetal polymer includes conventionally available materials such as Delrin, Kocetal, Ultraform, Celcon, Ramtal, Duracon, Kepital, Polypenco, and Hostaform. Preferably the polyacetal polymer is a poly(oxymethylene) glycol. Further, the copolymers may include cyclic esters and vinyl compounds such as ethylene oxide, propylene oxide, oxacyclobutane, 1,3-dioxolane, 3-propiolactone, gamma-butyrolactone, isobutylene, styrene, vinyl methyl ether, vinyl acetate, ethyl acetate and methyl methacrylate. Specific examples of the copolymers include trioxane/ethylene oxide copolymer and trioxane/1,3-dioxolane copolymer. Suitable acetal resins generally contain at least 80 mole %, preferably at least 90 mole %, of oxymethylene units in the main chain. The acetal resin generally has a melt flow rate, MFR (according to ASTM D-1 238-79 at 190° C. and under a load of 2160 g), of 0.1 to 50 g/10 min., preferably 0.2 to 30 g/10 min., more preferably 1.0 to 20 g/10 min, and a crystallinity of at least 80%, preferably at least 85%, 90% or 95%.

Figure 2A:
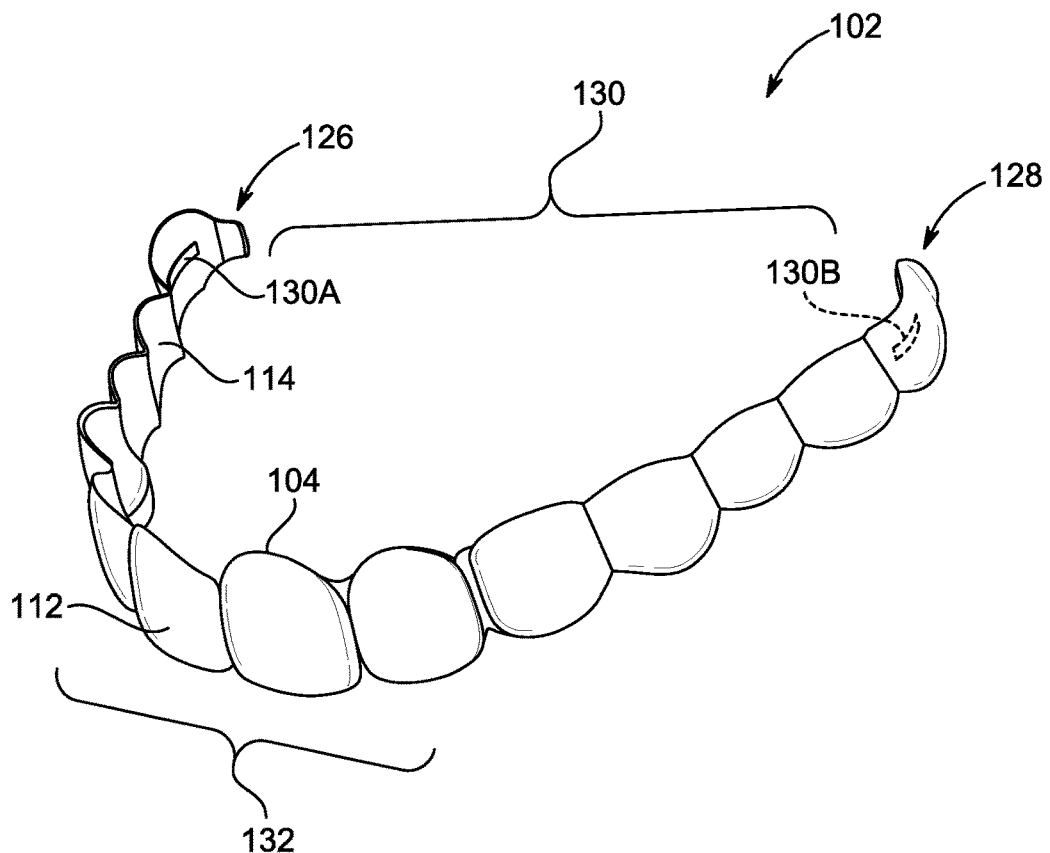
FIG. 2A is a right-top perspective view of the removable cosmetic dental structure for an upper jaw, according to an embodiment of the present disclosure.
Figure 2B:
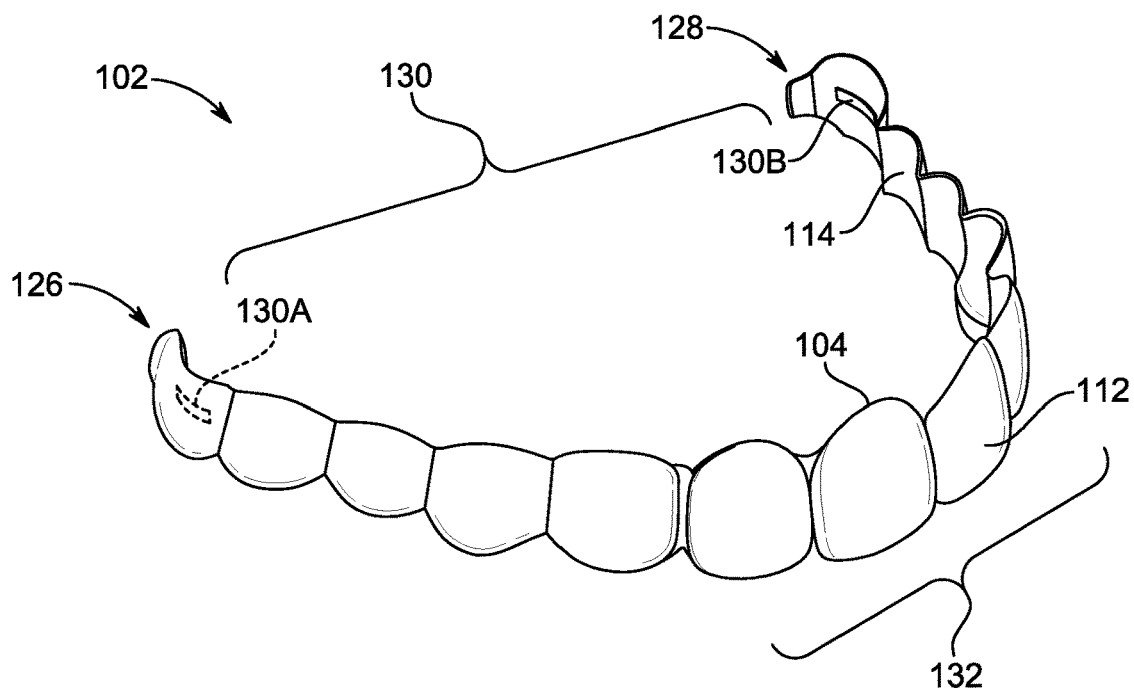
FIG. 2B is a left-top perspective view of the removable cosmetic dental structure for an upper jaw, according to an embodiment of the present disclosure.
Figure 2C:
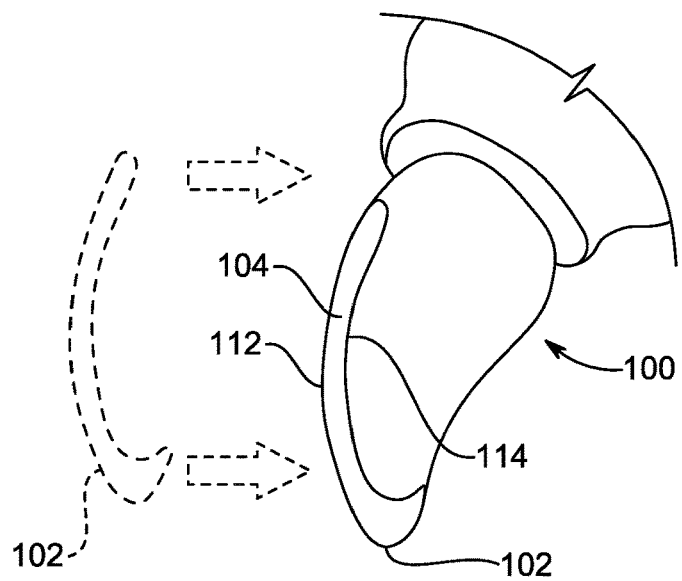
FIG. 2C is a schematic side view showing engagement of a rear side of the removable cosmetic dental structure with a facial surface of the tooth structure, according to an embodiment of the present disclosure.

Referring to FIG. 2A and FIG. 2B, a right-top perspective view and a left-top perspective view, respectively, of the removable cosmetic dental structure 102 are illustrated, according to various embodiments of the present disclosure. Referring to FIGS. 1, 2A and 2B, the removable veneer body 104 of the removable cosmetic dental structure 102 includes the front side 112 and the rear side 114. Further, the removable veneer body 104 incudes a first end 126 and a second end 128. The rear side 114 of the first end 126 of the removable veneer body 104 faces the facial surface 110 of the first posterior tooth 122 at the first end 118 of the tooth structure 100. Similarly, the rear side 114 of the second end 128 of the removable veneer body 104 faces the facial surface 110 of the second posterior tooth 124 at the second end 120 of the tooth structure 100. Referring to FIG. 2C, the rear side 114 of the removable cosmetic dental structure 102 has a shape in conformance with a shape of the facial surface 110 of the tooth structure 100, as such the rear side 114 of the removable cosmetic dental structure 102 is firmly attached with the entire facial surface 110 of the tooth structure 100. Right end of the removable veneer body 104 may be referred to as the first end 126 and left end of the removable veneer body 104 may be referred to as the second end 128.

The removable cosmetic dental structure 102 further includes one or more magnetic layers 130 integrated on the rear side 114 of the removable veneer body 104. The one or more magnetic layers 130 include a first magnetic layer 130A and a second magnetic layer 130B. The one or more magnetic layers 130 are configured to hold the removable veneer body 104 to the facial surface 110 of the tooth structure 100. In one example, while manufacturing the removable cosmetic dental structure 102, the one or more magnetic layers 130 may be integrated at the rear side 114 of the removable veneer body 104. More specifically, the first magnetic layer 130A and the second magnetic layer 130B may be integrated on the rear side 114 at the first end 126 and the second end 128, respectively, of the removable veneer body 104. In another example, the first magnetic layer 130A and the second magnetic layer 130B may be separately attached on the rear side 114 at the first end 126 and the second end 128, respectively, of the removable veneer body 104 using an adhesive or press fit.

The location of the first magnetic layer 130A and the second magnetic layer 130B may be defined based on various factors including, but not limited to, size and shape of the tooth structure 100. For example, the first magnetic layer 130A may be integrated on the rear side 114 at a location between the first end 126 and a front portion 132 of the removable veneer body 104. The location of the first magnetic layer 130A on the removable veneer body 104 may be at a location corresponding to a surface of the rear side 114 facing a right side of a molar teeth location, a premolar teeth location or a canine tooth location of the tooth structure 100. Similarly, the second magnetic layer 130B may be integrated on the rear side 114 at a location between the second end 128 and the front portion 132 of the removable veneer body 104. The location of the second magnetic layer 130B on the removable veneer body 104 may be at a location corresponding to a surface of the rear side 114 facing a left side of a molar teeth location, a premolar teeth location or a canine tooth location of the tooth structure 100. The front portion 132 of the removable veneer body 104 may be defined by incisor teeth of the tooth structure 100. Alternatively, the removable cosmetic dental structure 102 may include one or two additional magnetic layers apart from the first magnetic layer 130A and the second magnetic layer 130B. Such additional magnetic layers may be integrated on the rear side 114 at the premolar teeth location, canine teeth location or the front portion 132 of the removable veneer body 104. Further, the multiple magnetic layers may be located in the removable cosmetic dental structure 102 in a symmetric manner. As such, the location of the first magnetic layer 130A, the second magnetic layer 130B, and the additional magnetic layers integrated on the rear side 114 of the removable veneer body 104 may appear symmetric. In an embodiment, any number of magnetic layers may be integrated on the rear side 114 of the removable veneer body 104. In an embodiment, the first magnetic layer 130A and the second magnetic layer 130B may be positioned at any location along the rear side 114 of the removable veneer body 104.

In an embodiment, the first magnetic layer 130A is positioned towards a middle portion of the rear side 114 at the first end 126 of the removable veneer body 104. Also, the second magnetic layer 130B is positioned towards a middle portion of the rear side 114 at the second end 128 of the removable veneer body 104. The middle portion of the rear side 114 at the first end 126 or the second end 128 may refer to an area surrounding a mid-point defined by a lateral axis and a longitudinal axis of an individual tooth profile of the removable veneer body 104 corresponding to individual tooth of the tooth structure 100. In one example, the middle portion of the rear side 114 of the first end 126 may refer to a mid-point of a tooth profile of the removable veneer body 104 corresponding to the third molar tooth at the right side of the tooth structure 100. Similarly, the middle portion of the rear side 114 of the second end 128 may refer to a mid-point of a tooth profile of the removable veneer body 104 corresponding to the third molar tooth at the left side of the tooth structure 100. In another example, the first magnetic layer 130A and the second magnetic layer 130B may be positioned away from the middle portion and may locate proximal to an upper edge of the removable veneer body 104 at the first end 126 and the second end 128, respectively. In yet another example, the first magnetic layer 130A and the second magnetic layer 130B may be positioned away from the middle portion and may locate proximal to a lower edge of the removable veneer body 104 at the first end 126 and the second end 128, respectively.

In an embodiment, the magnetic layer 130 is at least one of a magnetic plate, a magnetic mesh, or a combination of the magnetic plate and the magnetic mesh. In one example, the first magnetic layer 130A and the second magnetic layer 130B may be formed as magnetic plate. In another example, the first magnetic layer 130A and the second magnetic layer 130B may be formed as magnetic mesh. In various other examples, combination of the magnetic plate and the magnetic mesh may be used to form the first magnetic layer 130A and the second magnetic layer 130B. In some embodiments, shape of the first magnetic layer 130A and the second magnetic layer 130B may be rectangular. Alternatively, the shape of the first magnetic layer 130A and the second magnetic layer 130B may be circular, oval, or any other polygon shape known in the art.

Figure 3A:
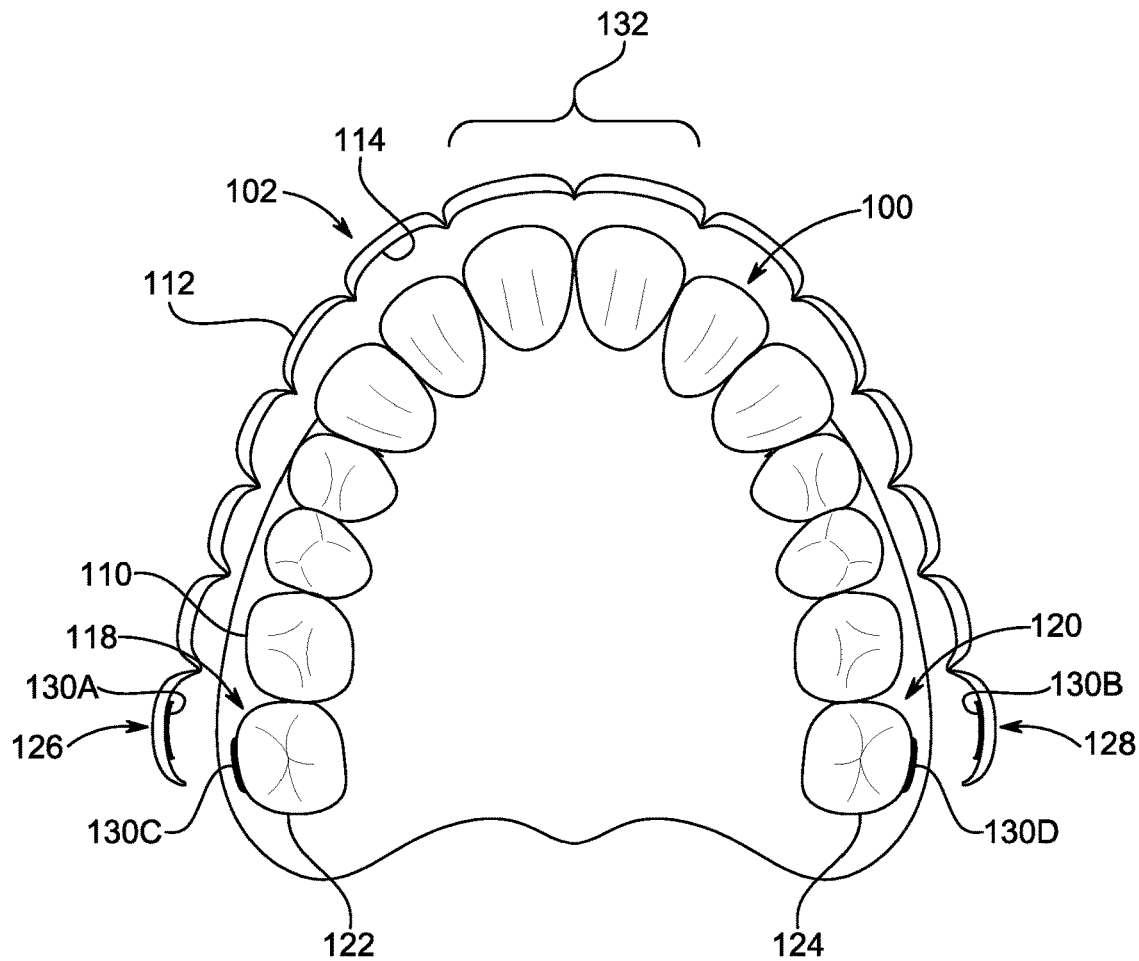
FIG. 3A is a schematic bottom view showing attachment of the removable cosmetic dental structure with the tooth structure of an upper jaw, according to an embodiment of the present disclosure.
Figure 3B:
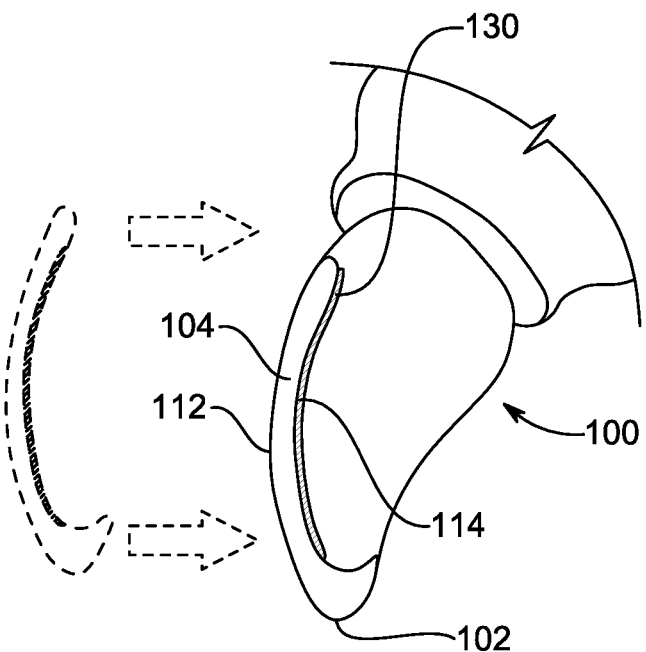
FIG. 3B is a schematic side view showing attachment of the removable cosmetic dental structure with the tooth structure of using magnetic layers, according to an embodiment of the present disclosure.
Figure 3C:
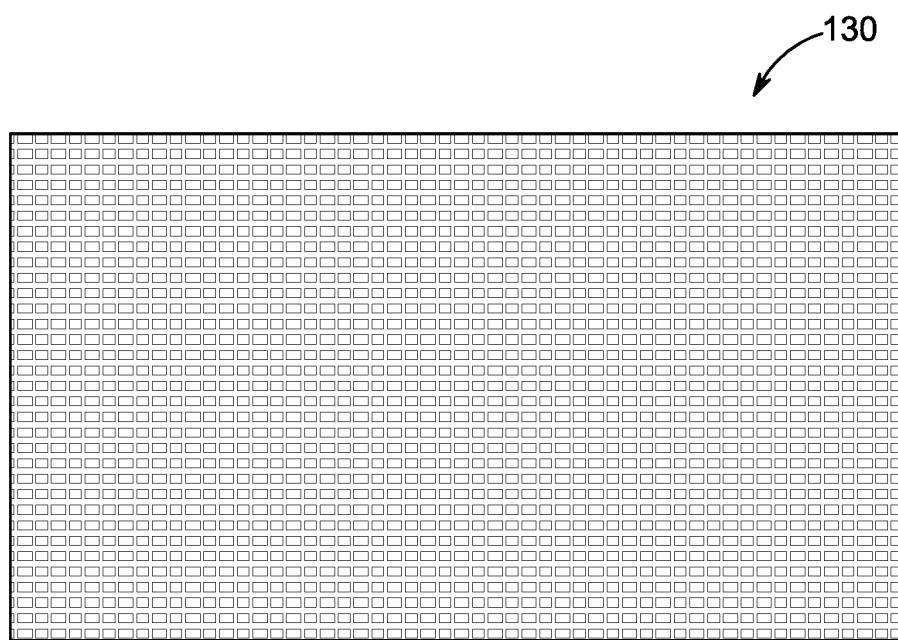
FIG. 3C is a schematic representation of a mesh type magnetic layer integrated with the removable cosmetic dental structure and the tooth structure, according to an embodiment of the present disclosure.
Figure 4B:
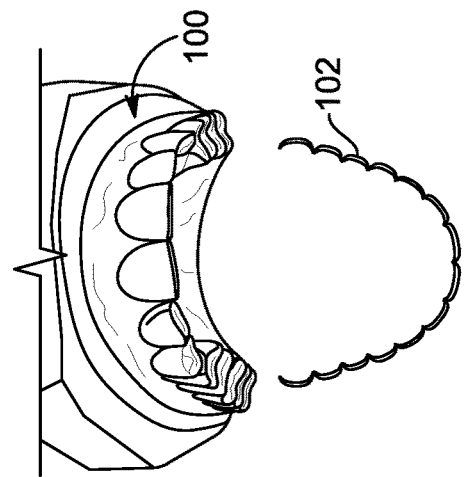
FIGS. 4A-4D are diagrammatic representation of fabrication and placement of the removable cosmetic dental structure, according to an embodiment of the present disclosure.
Figure 4D:
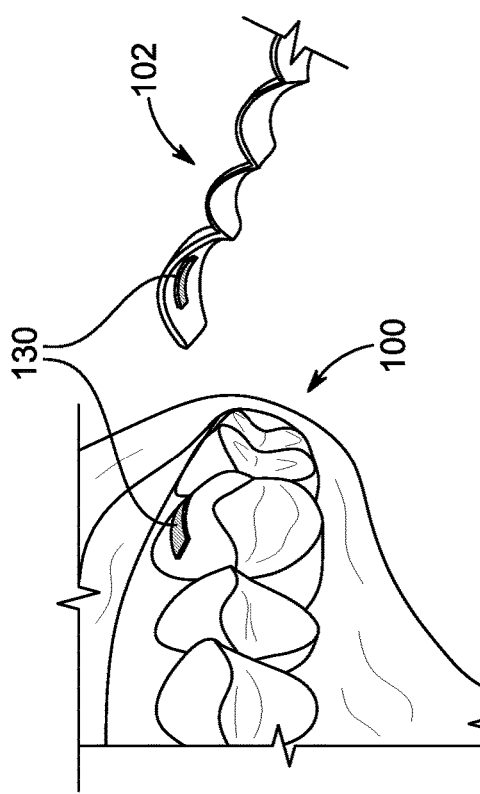
Figure 4A:
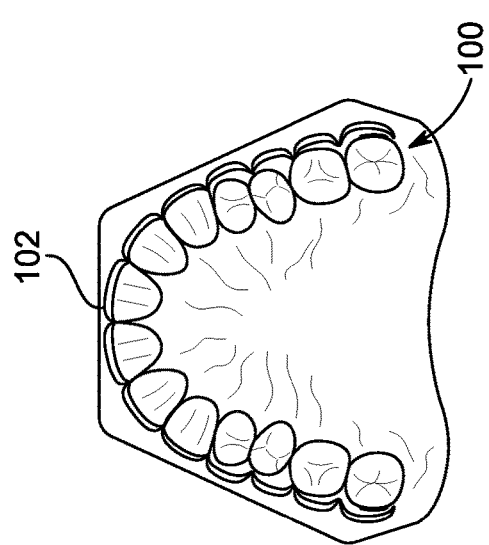
Figure 4C:
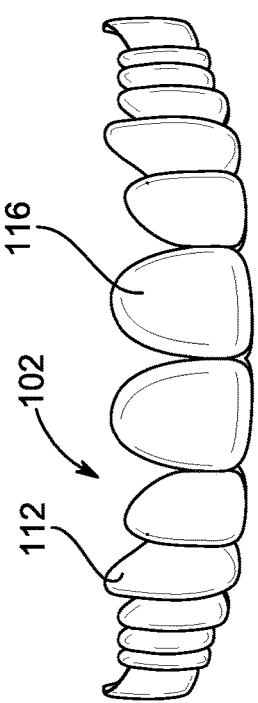

Referring to FIGS. 3A, 3B, and 3C, attaching the removable cosmetic dental structure 102 with the tooth structure 100 of the upper jaw using magnetic layers is illustrated, according to some embodiments of the present disclosure. A third magnetic layer 130C is placed on the facial surface 110 of the first posterior tooth 122 at the first end 118 of the tooth structure 100. Similarly, a fourth magnetic layer 130D is placed on the facial surface 110 of the second posterior tooth 124 at the second end 120 of the tooth structure 100. In an embodiment, the third magnetic layer 130C and the fourth magnetic layer 130D may be cemented using a suitable dental cement used in dentistry. In one example, the dental cement may permanently fix the third magnetic layer 130C and the fourth magnetic layer 130D over the facial surface 110 of the first posterior tooth 122 and the second posterior tooth 124, respectively. In another example, the dental cement may temporarily fix the third magnetic layer 130C and the fourth magnetic layer 130D over the facial surface 110 of the first posterior tooth 122 and the second posterior tooth 124, respectively. A weakening agent may be used at the time of removal of the third magnetic layer 130C and the fourth magnetic layer 130D from the facial surface 110 of the first end 118 and the second end 120, respectively, of the tooth structure 100. In an embodiment, any number of magnetic layers may be placed on the facial surface 110 of the tooth structure 100. In an embodiment, the third magnetic layer 130C and the fourth magnetic layer 130D may be positioned at any location along the facial surface 110 of the tooth structure 100. In an embodiment, magnetic layers placed on the facial surface 110 of the tooth structure 100 may have a polarity opposite to that of the polarity of magnetic layers placed on the rear side 114 of the removable veneer body 104.

In certain embodiments, thickness of the third magnetic layer 130C and the fourth magnetic layer 130D disposed over the facial surface 110 of the first posterior tooth 122 and the second posterior tooth 124, respectively, may be defined such that even after cementing the third magnetic layer 130C and the fourth magnetic layer 130D, the user may feel comfortable. Specifically, the skin portion that faces the first posterior tooth 122 and the second posterior tooth 124 and the tongue may not feel the presence of the third magnetic layer 130C and the fourth magnetic layer 130D over the facial surface 110 of the first posterior tooth 122 and the second posterior tooth 124, respectively.

The tooth structure 102 may further include additional magnetic layers apart from the third magnetic layer 130C and the fourth magnetic layer 130D. In one example, the facial surface 110 of the premolar teeth at the first end 118 and the second end 120 of the tooth structure 100 may include additional magnetic layers. In another example, the additional magnetic layers may be placed at the front portion 132 of the tooth structure 100 such as the incisor teeth portion. Also, the position of the third magnetic layer 130C, the fourth magnetic layer 130D and the additional magnetic layers may be symmetric with respect to each other towards the first end 118 and the second end 120 of the tooth structure 100. The number of magnetic layers is therefore not restrictive, and any number of magnetic layers may be integrated at the first end 118 and the second end 120 of the tooth structure 100.

In an alternate embodiment, the third magnetic layer 130C and the fourth magnetic layer 130D may be embedded within the first posterior tooth 122 and the second posterior tooth 124, respectively, and at least a portion of the third magnetic layer 130C and the fourth magnetic layer 130D may be exposed towards the facial surface 110 of the tooth structure 100. In an example, the first posterior tooth 122 and the second posterior tooth 124 may be drilled and the third magnetic layer 130C and the fourth magnetic layer 130D may, respectively, be placed within the drilled portion. After placing the third magnetic layer 130C and the fourth magnetic layer 130D, the drilled portion may be filled by the dental cement such that the third magnetic layer 130C and the fourth magnetic layer 130C may be firmly attached to the tooth structure 100. In some embodiments, the first magnetic layer 130A, the second magnetic layer 130B, the third magnetic layer 130C and the fourth magnetic layer 130D may be selected from the magnetic mesh 130 as shown in FIG. 3C. In an embodiment, the magnetic mesh 130 may have a thickness of 30 nanometer (nm), although the magnetic mesh 130 may have any other thickness value. In an embodiment the magnetic mesh 130 is a thin soft magnetic film that may preferably have a thickness of less than 30 nm. In some embodiments, the first magnetic layer 130A, the second magnetic layer 130B, the third magnetic layer 130C and the fourth magnetic layer 130D may be selected from the magnetic plate or the combination of the magnetic plate and the magnetic mesh 130.

In an embodiment, the first magnetic layer 130A, the second magnetic layer 130B, the third magnetic layer 130C and the fourth magnetic layer 130D may have a thickness value in a range of 0.1 mm to 0.5 mm and preferably has a thickness value is 0.25 mm, although any other thickness value may also be included. In an embodiment, the first magnetic layer 130A, the second magnetic layer 130B, the third magnetic layer 130C and the fourth magnetic layer 130D may preferably have a thickness value in a range of 0-30 nm and preferably has a thickness value is 0.25 nm, although any other thickness value may also be included.

Referring to FIG. 4, while manufacturing the removable cosmetic dental structure 102, the position of the first magnetic layer 130A on the rear side 114 of the removable veneer body 104 may be defined to align with the third magnetic layer 130C of the tooth structure 100. The rear side 114 is directly adjacent the facial surface 110 of human teeth of the tooth structure 100. Similarly, the position of the second magnetic layer 130B on the rear side 114 of the removable veneer body 104 may be defined to align with the fourth magnetic layer 130D of the tooth structure 100. Further, any additional magnetic layers, other than the first magnetic layer 130A and the second magnetic layer 130B, on the rear side 114 of the removable veneer body 104 may be aligned with the additional magnetic layers, other than the third magnetic layer 130C and the fourth magnetic layer 130D, of the tooth structure 100. Accordingly, the number and the position of the magnetic layers 130 integrated on the rear side 114 at the first end 126 and the second end 128 of the removable veneer body 104 may match with the number and the position of the magnetic layers disposed over the facial surface 110 at the first end 118 and the second end 120 of the tooth structure 100.

The third magnetic layer 130C and the first magnetic layer 130A have opposite polarity. Thus, the first magnetic layer 130A integrated on the rear side 114 of the first end 126 of the removable veneer body 104 is configured to magnetically attract to the third magnetic layer 130C placed on the facial surface 110 of the first posterior tooth 122 at the first end 118 of the tooth structure 100. Similarly, the fourth magnetic layer 130D and the second magnetic layer 130B have opposite polarity. Thus, the second magnetic layer 130B integrated on the rear side 114 of the second end 128 of the removable veneer body 104 is configured to magnetically attract to the fourth magnetic layer 130D placed on the facial surface 110 of the second posterior tooth 124 at the second end 120 of the tooth structure 100. For example, if the polarity of first magnetic layer 130A is a south pole, then the third magnetic layer 130C may have a north pole and vice versa. Similarly, if the polarity of second magnetic layer 130B is a south pole, the fourth magnetic layer 130D may have a north pole and vice versa. Such configuration of the polarity of the first and third magnetic layers 130A, 130C and the second and fourth magnetic layers 130B, 130D help to generate an attractive force between the removable veneer body 104 and the tooth structure 100, when the removable cosmetic dental structure 102 is aligned with the tooth structure 100.

During the implementation, the removable cosmetic dental structure 102 is placed in the mouth of the user such that the rear side 114 of the removable veneer body 104 is aligned with the facial surface 110 of the tooth structure 100. The first end 126 and the second end 128 of the removable veneer body 104 are aligned with the first end 118 and the second end 120 of the tooth structure 104, respectively. As such, the rear side 114 of the removable veneer body 104 covers at least the portion of the facial surface 110 of the tooth structure 100. Particularly, the rear side 114 of the first end 126 of the removable veneer body 104 faces the facial surface 110 of the first posterior tooth 122 at the first end 118 of the tooth structure 100. Similarly, the rear side 114 of the second end 128 of the removable veneer body 104 faces the facial surface 110 of the second posterior tooth 124 at the second end 120 of the tooth structure 100. Due to the opposite polarity, the first magnetic layer 130A and the second magnetic layer 130B of the removable cosmetic dental structure 102 are firmly attached to the third magnetic layer 130C and the fourth magnetic layer 130D, respectively, placed over the facial surface 110 of the tooth structure 100. Thus, the first, second, third and fourth magnetic layers 130A, 130B, 130C, 130D are together configured to hold the removable cosmetic dental structure 102 with the facial surface 110 of the tooth structure 100.

Figure 5:
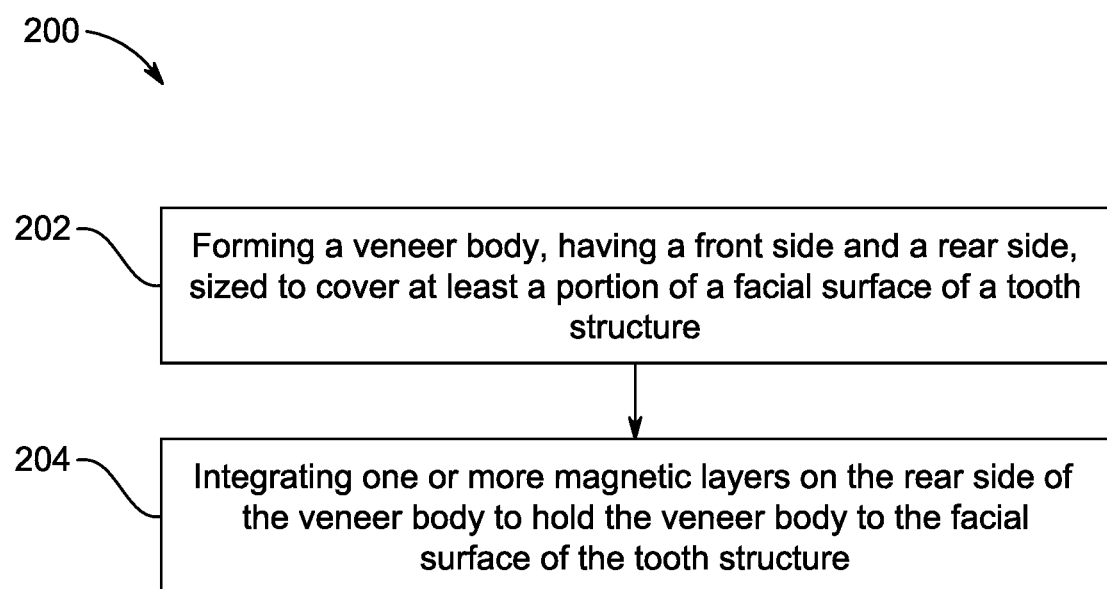
FIG. 5 is a flow diagram of a method for fabricating the removable cosmetic dental structure, according to an embodiment of the present disclosure.

Referring to FIG. 5, a method 200 for fabricating the removable cosmetic dental structure 102 is illustrated, according to an embodiment of the present disclosure. The method 200 for fabricating the removable cosmetic dental structure 102 is explained with reference to FIGS. 1 through 4D. At step 202, the method 200 includes forming the removable veneer body 104 sized to cover at least the portion of the facial surface 110 of the tooth structure 100. The removable veneer body 104 includes the front side 112 and the rear side 114. The removable veneer body 104 may be formed in such a way that at least the portion of the front side 112 thereof may be shaped to resemble the tooth surface 116 and the rear side 114 of the removable veneer body 104 may cover at least the portion of the facial surface 110 of the tooth structure 100. After the formation of the removable veneer body 104, at step 204, the method 200 includes integrating the one or more magnetic layers 130 on the rear side 114 of the removable veneer body 104. More specifically, the one or more magnetic layers 130 include the first magnetic layer 130A and the second magnetic layer 130B. The removable veneer body 104 includes the first end 126 and the second end 128 such that the first magnetic layer 130A is integrated on the rear side 114 of the first end 126 and the second magnetic layer 130A is integrated on the rear side 114 of the second end 128. The first magnetic layer 130A may be positioned towards the middle portion of the rear side 114 of the first end 126 of the removable veneer body 104 and the second magnetic layer 130B may be positioned towards the middle portion of the rear side 114 of the second end 128 of the removable veneer body 104. The first magnetic layer 130A and the second magnetic layer 130B create the attractive force with the third magnetic layer 130C integrated at the facial surface 110 of the first posterior tooth 122 and the fourth magnetic layer 130D integrated at the facial surface 110 of the second posterior tooth 124, respectively, and thereby hold the removable veneer body 104 with the tooth structure 100.

The first magnetic layer 130A, the second magnetic layer 130B, the third magnetic layer 130C and the fourth magnetic layer 130D may be selected from at least one of the magnetic plate, the magnetic mesh, or the combination of the magnetic plate and the magnetic mesh. Also, the removable cosmetic dental structure 102 comprising the removable veneer body 104 may be manufactured using the material selected from high performance resin, thermoplastic resin, porcelain, composite material, polyacetal polymer, or copolymer that is preferably crystalline.

The removable cosmetic dental structure 102 of the present disclosure, when attached to the tooth structure 100, provides the user with additional comfort while speaking, as the removable veneer body 104 does not cover the palatal surface of the user's palate, this enables the user to speak without any difficulty in pronunciation or communication. Also, the removable veneer body 104 does not cover the occlusal surface of the tooth structure 110, hence the user feels no discomfort in eating. At the time of removal of the removable cosmetic dental structure 102, the user can easily pull out the removable cosmetic dental structure 102 without causing any pain as the removable veneer body 104 is attracted to the facial surface 110 of the tooth structure 100 due to the magnetic attractive force between the magnetic layers. Since the thickness of the magnetic layers is thin, the user wearing the removable veneer body 104 does not feel the presence of the magnetic layers over the facial surface 110 of the tooth structure 100.

Various, embodiments, examples and position of the components used in the disclosure are merely disclosed as an example. Any person skilled in the relevant art may perform numerous modifications and variations of the present disclosure such as position of the magnetic layers, size of the magnetic layers, shapes of the magnetic layers over the rear side of the removable veneer body and the facial surface of the tooth, involved in the invention in light of the above teachings. It is therefore to be understood that within the scope of the appended claims, the invention may be practiced otherwise than as specifically described herein.

The invention claimed is:

1. A cosmetic dental system, consisting of:
a removable veneer body sized to cover only a facial surface of a plurality of human teeth of an upper jaw or a lower jaw, wherein the removable veneer body has a front side and a rear side wherein the rear side is directly adjacent the facial surface of the human teeth; and
wherein the removable veneer body has a first end and a second end, and a first magnetic layer is integrated on the rear side of the first end and a second magnetic layer is integrated on the rear side of the second end,
wherein the rear side of the first end of the removable veneer body faces a facial surface of a first posterior tooth at a first end of the upper jaw or the lower jaw and wherein the rear side of the second end of the removable veneer body faces a facial surface of a second posterior tooth at a second end of the upper jaw or the lower jaw;
a third magnetic layer adapted to be placed on the facial surface of the first posterior tooth at the first end of the upper jaw or the lower jaw, wherein the first magnetic layer and third magnetic layer have opposite polarity,
a fourth magnetic layer adapted to be placed on the facial surface of the second posterior tooth at the second end of the upper jaw or the lower jaw, wherein the second magnetic layer and the fourth magnetic layer have opposite polarity.

2. The cosmetic dental system of claim 1, wherein said cosmetic dental system is comprised of a material selected from thermoplastic resin, porcelain, composite material, polyacetal polymer, or crystalline copolymer.

3. The cosmetic dental system of claim 1, wherein one or more of the magnetic layers is at least one of a magnetic plate, a magnetic mesh, or a combination of magnetic plate and magnetic mesh.

4. The cosmetic dental system of claim 1, wherein at least a portion of the front side of the veneer body is shaped to resemble a tooth surface.

5. The cosmetic dental system of claim 1, wherein the removable veneer body is adapted to cover the facial surfaces of all of the teeth of the upper jaw.

6. The cosmetic dental system of claim 1, wherein the removable veneer body is adapted to cover the facial surfaces of all of the teeth of the lower jaw.

7. The cosmetic dental system of claim 1, wherein the removable veneer body is configured for an upper jaw, and the first magnetic layer integrated on the rear side of the first end and the second magnetic layer integrated on the rear side of the second end are the only magnetic layers of the removable veneer body.

8. The cosmetic dental system of claim 1, wherein the removable veneer body is configured for an upper jaw and the rear side is directly adjacent to the facial surfaces of all of the teeth of the plurality of human teeth of the upper jaw.

9. The cosmetic dental system according to claim 1, wherein the front side and the rear side of the removable veneer body are continuous.

\* \* \* \* \*